(12) United States Patent
Endo et al.

(10) Patent No.: US 7,995,136 B2
(45) Date of Patent: Aug. 9, 2011

(54) IMAGE SENSING APPARATUS AND CONTROL METHOD FOR THE SAME

(75) Inventors: Junichi Endo, Kawasaki (JP); Yoshihiko Konno, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 555 days.

(21) Appl. No.: 12/121,241

(22) Filed: May 15, 2008

(65) Prior Publication Data
US 2008/0291317 A1 Nov. 27, 2008

(30) Foreign Application Priority Data

May 24, 2007 (JP) ................................. 2007-138197

(51) Int. Cl.
*G03B 7/00* (2006.01)
*H04N 3/14* (2006.01)

(52) U.S. Cl. ...................... 348/362; 348/296

(58) Field of Classification Search .................. 348/345, 348/340, 349, 362, 363, 367, 296, 297, 221.1
See application file for complete search history.

(56) References Cited

U.S. PATENT DOCUMENTS

| | | | | |
|---|---|---|---|---|
| 5,727,241 | A * | 3/1998 | Yamano et al. | 396/279 |
| 6,542,194 | B1 * | 4/2003 | Juen | 348/367 |
| 6,952,291 | B2 * | 10/2005 | Suzuki et al. | 358/483 |
| 7,538,816 | B2 * | 5/2009 | Harada | 348/362 |

FOREIGN PATENT DOCUMENTS

| | | |
|---|---|---|
| JP | 11-041523 | 2/1999 |
| JP | 2006-101492 | 4/2006 |
| WO | 2006/036921 A | 4/2006 |
| WO | 2007/011002 A | 1/2007 |
| WO | WO 2007011002 A1 * | 1/2007 |

OTHER PUBLICATIONS

The above references were cited in a Feb. 5, 2010 Chinese Office Action, which is enclosed with English Translation, that issued in Chinese Patent Application No. 200810098302.1.

* cited by examiner

*Primary Examiner* — Lin Ye
*Assistant Examiner* — Ahmed Berhan
(74) *Attorney, Agent, or Firm* — Cowan, Liebowitz & Latman, P.C.

(57) ABSTRACT

An image sensing apparatus in which a plurality of lens units can be exchanged and attached. The image sensing apparatus includes an acquiring unit configured to acquire, from an attached lens unit, lens information including at least an exit pupil distance of the lens unit, an image sensor including a plurality of pixels for converting incident light into electrical charges corresponding to the amount of incident light, a shutter unit configured to shield the image sensor from light, a reset unit configured to sequentially reset the pixels of the image sensor in a traveling direction of the shutter unit prior to starting to shield the image sensor from light using the shutter unit, and a control unit configured to control a timing for resetting the pixels, based on the acquired lens information, where photography is prohibited when the lens information fails to be acquired.

5 Claims, 6 Drawing Sheets

IMAGE SENSING APPARATUS AND CONTROL METHOD FOR THE SAME

BACKGROUND OF THE INVENTION

1. Field of the Invention

The present invention relates to an image sensing apparatus and a control method for the image sensing apparatus, and more particularly, to an image sensing apparatus in which an electronic shutter function and a mechanical shutter function are used in combination to carry out photography, and a control method for the image sensing apparatus.

2. Description of the Related Art

There are some singe-lens reflex digital cameras in which a focal-plane shutter that is a mechanical shutter and an electronic shutter are used in combination to carry out photography. In this type of shutter mechanism, the mechanical shutter constitutes a rear curtain, and photography is carried out by, prior to traveling of the rear curtain, driving the electronic shutter for scanning pixels of an image sensor to start charge accumulation.

In a case in which the electronic shutter is used to carry out photography, for example, in an image sensor using a CMOS sensor, reset scan is first carried out for setting the amount of accumulated electric charge in pixels for each pixel or for each region composed of a plurality of pixels (for example, for each line) to zero. After that, scan for reading out signals after a predetermined period of time for each pixel or each region subjected to the reset scan is carried out, thereby photography using the electronic shutter can be achieved.

In a case in which the above-described electronic shutter and mechanical shutter are used in combination to control exposure of the image sensor to light, reset scan is first carried out sequentially for each region composed of a plurality of pixels of the image sensor (for example, for each line) in the traveling direction of the mechanical shutter as scan of the image sensor for starting charge accumulation. Then, after a predetermined period of time, the image sensor is sequentially shielded from light using the rear curtain of the mechanical shutter, and reading scan is then carried out for sequentially reading out electric charge accumulated in each pixel. Therefore, the scan pattern for this reset scan is adapted to traveling characteristics of the rear curtain of the mechanical shutter (see, for example, Japanese Patent Laid-Open No. 11-41523)

Further, Japanese Patent Laid-Open No. 2006-101492 proposes an image sensing device in which a scan pattern for starting exposure is corrected using a difference between a first image, for which both start and end of exposure are controlled using an electronic shutter, and a second image, for which scan for starting exposure is carried out using the electronic shutter while the exposure is ended using a mechanical shutter.

Singe-lens reflex digital cameras are generally capable of connecting to exchangeable photographing lenses, and the focal length and the exit pupil distance (the distance from an image plane to an exit pupil position of the lens) vary depending on the attached photographing lenses. Therefore, in a case in which an image sensing apparatus is configured so that an electronic shutter and a mechanical shutter are used in combination to carry out photography as described above, the following problems arise. Specifically, the electronic shutter functions on the plane of the image sensor, whereas the mechanical shutter is located a little away from the plane of the image sensor in the direction of an optical axis. Accordingly, the position on the plane of the image sensor for the mechanical shutter providing a shield from light varies depending on the focal length, the exit pupil distance, and the like of the photographing lens. Therefore, particularly when the exposure time from reset scan to shielding from light by the mechanical shutter is short, unevenness of exposure will arise in the traveling direction of the shutter depending on the focal length, the exit pupil distance, and the like of the attached photographing lens. Since it is not possible for a photographer to notice this unevenness of exposure before photography, there is a problem in that the photographer will notice the unevenness when checking a photographed image.

Therefore, in an image sensing apparatus in which an electronic shutter and a mechanical shutter are used in combination, further improvement is needed in order to reduce unevenness of exposure in the scan direction of the shutter, which varies depending on the type of a lens.

SUMMARY OF THE INVENTION

The present invention has been made in consideration of the above situation, and has as its object to photograph images with unevenness of exposure reduced in a case in which an electronic shutter and a mechanical shutter are used in combination to carry out photography in an image sensing apparatus with an exchangeable lens unit.

According to one aspect of the present invention, there is provided an image sensing apparatus in which a plurality of lens units can be exchanged and attached, the image sensing apparatus comprising: an acquisition unit configured to acquire, from an attached lens unit, lens information including at least an exit pupil distance of the lens unit; an image sensor comprising a plurality of pixels for converting incident light into electrical charges corresponding to an amount of incident light; a shutter unit configured to shield the image sensor from light; a reset unit configured to sequentially reset the pixels of the image sensor in a traveling direction of the shutter unit, prior to starting to shield the image sensor from light using the shutter unit; and a control unit configured to control timing for resetting the pixels using the reset unit, based on the lens information acquired using the acquisition unit, wherein photography is prohibited in a case in which the lens information fails to be acquired using the acquisition unit.

According to another aspect of the present invention, there is provided an image sensing apparatus in which a plurality of lens units can be exchanged and attached, the image sensing apparatus comprising: an acquisition unit configured to acquire, from an attached lens unit, lens information including at least an exit pupil distance of the lens unit; an image sensor comprising a plurality of pixels for converting incident light into electrical charges corresponding to an amount of incident light; a shutter unit configured to shield the image sensor from light; a reset unit configured to sequentially reset the pixels of the image sensor in a traveling direction of the shutter unit, prior to starting to shield the image sensor from light using the shutter unit; a calculation unit configured to calculate timing for resetting the pixels such that a time period from resetting using the reset unit to shielding the image sensor from light entering through the lens unit by traveling of the shutter unit is equal for each pixel of the image sensor in a case in which the lens information fails to be acquired using the acquisition unit; and a control unit configured to control timing for resetting the pixels using the reset unit based on the acquired lens information in a case in which the lens information is acquired using the acquisition unit, and based on the timing calculated using the calculation unit in a case in which the lens information fails to be acquired.

According to still another aspect of the present invention, there is provided a control method for an image sensing apparatus in which a plurality of lens units can be exchanged and attached, the image sensing apparatus comprising an image sensor comprising a plurality of pixels for converting incident light into electrical charges corresponding to an amount of incident light and a shutter unit configured to shield the image sensor from light, the control method comprising: an acquiring step of acquiring, from an attached lens unit, lens information including at least an exit pupil distance of the lens unit; a reset step of sequentially resetting the pixels of the image sensor in a traveling direction of the shutter unit; a shutter traveling step of causing the shutter unit to travel to sequentially shield the pixels from light; a determination step of determining, prior to the reset step, timing for resetting the pixels in the reset step, based on the lens information acquired in the acquiring step; and a prohibiting step of prohibiting photography in a case in which the lens information fails to be acquired in the acquiring step, wherein in the reset step the reset can be carried out based on the timing determined in the determination step.

According to yet another aspect of the present invention, there is provided a control method for an image sensing apparatus in which a plurality of lens units can be exchanged and attached, the image sensing apparatus comprising an image sensor comprising a plurality of pixels for converting incident light into electrical charges corresponding to an amount of incident light, and a shutter unit configured to shield the image sensor from light, the control method comprising: an acquiring step of acquiring, from an attached lens unit, lens information including at least an exit pupil distance of the lens unit; a reset step of sequentially resetting the pixels of the image sensor in a traveling direction of the shutter unit; a shutter traveling step of causing the shutter unit to travel to sequentially shield the pixels from light; a calculation step of calculating timing for resetting the pixels such that a time period from resetting the pixels in the reset step to shielding the pixels from light entering through the lens unit by traveling of the shutter unit is equal for each pixel, in a case in which the lens information fails to be acquired in the acquiring step; and a determination step of determining timing for resetting the pixels in the reset step based on the acquired lens information in a case in which the lens information is acquired in the acquiring step, and based on the timing calculated in the calculation step in a case in which the lens information fails to be acquired, wherein in the reset step the reset can be carried out based on the timing determined in the determination step.

Further features of the present invention will become apparent from the following description of exemplary embodiments (with reference to the attached drawings).

DESCRIPTION OF THE EMBODIMENTS

A preferred embodiment of the present invention will be described in detail in accordance with the accompanying drawings.

Figure 1:
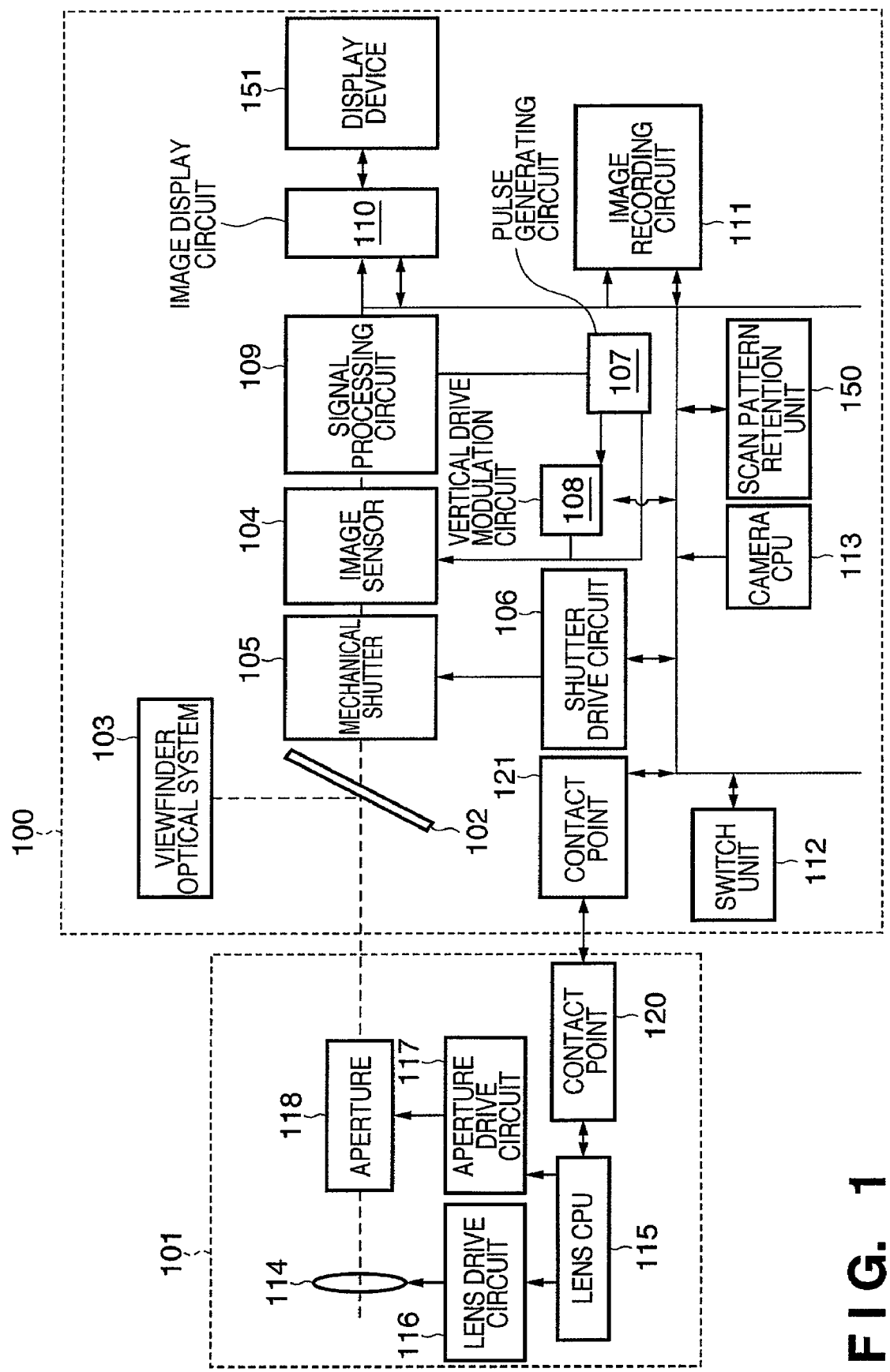
FIG. 1 is a block diagram illustrating a configuration of an image sensing apparatus according to an embodiment of the present invention.

FIG. 1 is a block diagram illustrating the configuration of an image sensing system according to an embodiment of the present invention. The image sensing system according to the embodiment includes a camera main body 100 that is an image sensing apparatus and an exchangeable lens unit 101 attached to the camera main body 100.

First, a description is given of the internal configuration of the lens unit 101.

Reference numeral 114 designates a photographing lens that is movable in the direction of an optical axis. It is to be noted that although the photographing lens 114 is represented as one lens in FIG. 1, the photographing lens 114 is in fact composed of a plurality of lenses such as a focus lens and a zoom lens. A lens CPU 115 controls the photographing lens 114 and an aperture 118 driven via a lens drive circuit 116 and an aperture drive circuit 117. The lens CPU 115 can communicate with a camera CPU 113 in the camera main body 100 described below via a contact point 120 on the lens unit 101 side and a contact point 121 on the camera main body 100 side. The lens CPU 115 notifies the camera CPU 113 of the type of the lens unit 101, a focal length, an exit pupil distance, a zoom position, and the like, via the contact points 120 and 121.

Next, the configuration of the camera main body 100 will be described.

When the image sensing apparatus is in a non-photographing state (the state shown in FIG. 1), some of light rays from an object, which have passed through the photographing lens 114 and the aperture 118 of the lens unit 101 are reflected by a mirror 102 positioned on a photographic optical path and directed to a viewfinder optical system 103, thereby allowing a photographer to observe an image of the object via the viewfinder optical system 103.

When a release button described below, not shown, is pressed to shift from the non-photographing state to a photographing state, the mirror 102 is withdrawn from the photographic optical path, thereby directing light rays from the object which enter from the lens unit 101 to an image sensor 104 composed of a CMOS sensor, a CCD, or the like. Each pixel of the image sensor 104, while being exposed, subjects an optical image of the object, which is formed by the lens unit 101, to photoelectric conversion depending on the amount of light, and accumulates the acquired electrical charges. Scan clocks (horizontal drive pulses) and predetermined control pulses are supplied from a pulse generating circuit 107 to the image sensor 104. Among scan clocks generated in the pulse generating circuit 107, vertical scanning clocks are modulated to predetermined clock frequencies by a vertical drive modulation circuit 108, and input to the image sensor 104. This vertical drive modulation circuit 108 determines a scan pattern for reset scan as an electronic front curtain. In addition, the pulse generating circuit 107 also outputs clock signals to a signal processing circuit 109 described below.

A focal plane shutter (hereinafter, referred to as "mechanical shutter") 105 that is a mechanical shutter is disposed on the object side (the lens side) with respect to the image sensor 104. The mechanical shutter 105 has a rear curtain (hereinafter, referred to as "mechanical rear curtain") composed of a plurality of shutter blades, and shields the image sensor 104 from light. The camera CPU 113 controls diving of the mechanical shutter 105 via a shutter drive circuit 106.

The signal processing circuit 109 generates image data by performing predetermined processing (such as color processing or gamma correction) on signals read out from the image sensor 104. The generated image data is output via an image display circuit 110 to a display device 151 to be displayed as photographed images or recorded on an image recording circuit 111. A switch unit 112 includes a switch for controlling ON/OFF of a main power supply, a switch operated for setting photographing conditions and the like, and a switch (release button) operated for starting photography preparation and photography. Pressing the release button halfway (switch SW1 ON) starts photography preparation (photometry, focus control, and the like). Further, pressing the release button fully (switch SW2 ON) starts photography (the image sensor 104 is exposed to light and electrical charges signals are read out, and image data acquired by processing electrical charges signals is recorded onto a recording medium). The camera CPU 113 operates in accordance with the operation of the switch unit 112. A scan pattern retention unit 150 retains several types of scan patterns (timing for movement of a reset line) for an electronic front curtain as described below.

The image sensing apparatus in the embodiment, which has the configuration described above, typically employs an electronic front curtain of an electronic shutter which sequentially subjects pixels of the image sensor 104 to reset scan, instead of a front curtain composed of a plurality of shutter blades, and is configured to use the electronic front curtain and the mechanical rear curtain to carry out exposure control for the image sensor 104.

Figure 2:
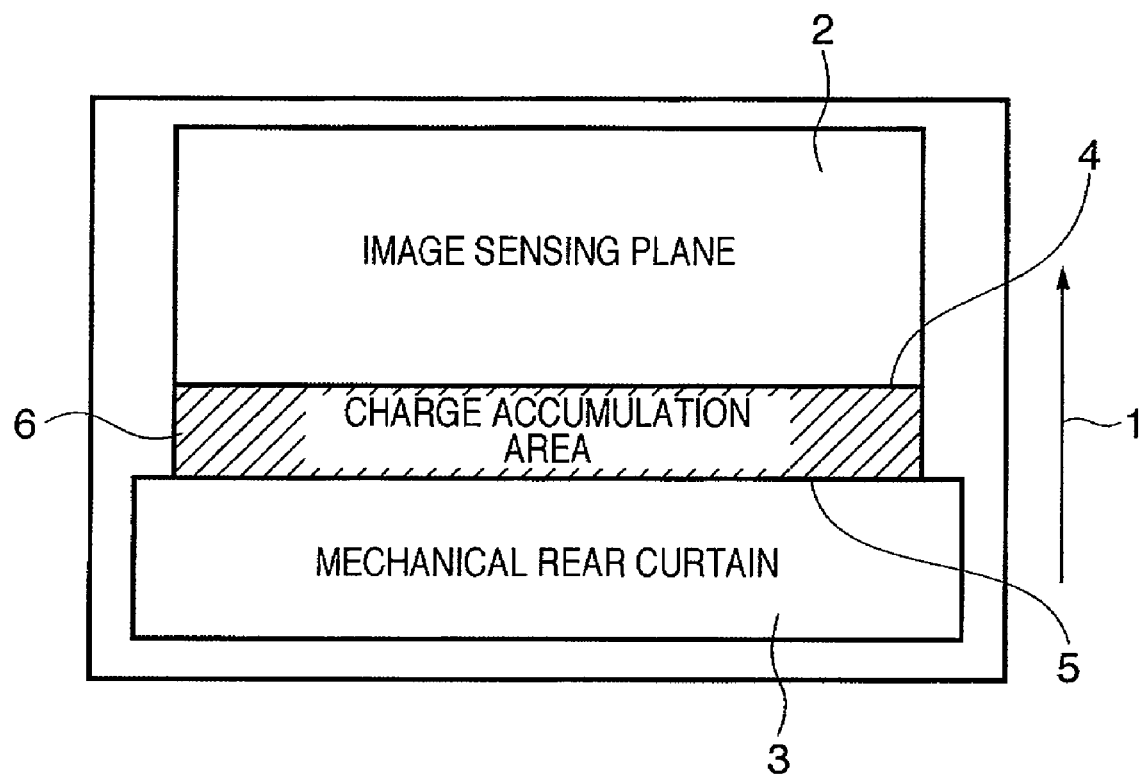
FIG. 2 is a front view of an image sensor and a shutter according to the embodiment according to the present invention when viewed from an object.

FIG. 2 is a front view illustrating the image sensor 104 and the mechanical rear curtain observed along the optical axis from the lens side, which shows a state after the start of photography by pressing the release button and during reset scan with the electronic front curtain and traveling of the mechanical rear curtain. An arrow 1 indicates the scan direction of the reset scan with the electronic front curtain (the traveling direction of the electronic front curtain) and the traveling direction of the mechanical rear curtain. It is to be noted that an image of the object formed by the photographing lens 114 onto an image sensing plane of the image sensor 104 is upside down. Therefore, the reset scan from the bottom of the image sensing plane upward as shown in FIG. 2 will result in reset scan and traveling of the mechanical rear curtain from top to bottom of the image.

In FIG. 2, reference numeral 2 designates the image sensing plane of the image sensor 104, and reference numeral 3 designates the mechanical rear curtain of the mechanical shutter 105. FIG. 2 shows a state in which the mechanical rear curtain 3 shields a portion of the image sensing plane 2 from light. Reference numeral 4 designates a line (reset line) carrying out reset scan in the image sensor 104. The reset scan is carried out to reset the amount of accumulated electrical charges of pixels on the reset line 4 to zero, and the reset line 4 corresponds to the distal end of the electronic front curtain.

An area 6 formed by a slit between the reset line 4 and the distal end 5 of the mechanical rear curtain 3 is an area (charge accumulation area) for charge accumulation by exposure in the image sensor 104. The charge accumulation area 6 will move in the direction of the arrow 1 in accordance with the electronic front curtain and the mechanical rear curtain 3. The time from passage of the reset line 4, that is, from reset of the pixels, to light shielding by the mechanical rear curtain 3 corresponds to charge accumulation period of exposure of the pixels to light. As described, the reset line 4 moves in the direction of the arrow 1 to start charge accumulation for each line, and thus the timing for starting charge accumulation differs from line to line the image sensor 104. In the example shown in FIG. 2, charge accumulation is carried out at the earliest timing on the lowermost line in the image sensing plane 2, and at the latest timing on the uppermost line therein.

The movement of the reset line 4 from the bottom of the image sensing plane 2 upward is controlled by the vertical drive modulation circuit 108, as described below with reference to FIGS. 5A and 5B. This movement pattern of the reset line 4 is referred to as a "scan pattern". This scan pattern can be said to represent the timing for reset scan for each line of the image sensor 104. The scan pattern retention unit 150 retains a plurality of scan patterns which varies depending on, for example, the focal length and the exit pupil distance. The camera CPU 113 selects one of these scan patterns depending on the focal length and the exit pupil distance, and controls the vertical drive modulation circuit 108 such that the reset line 4 moves in accordance with the selected scan pattern. Details will be described below.

Figure 3:
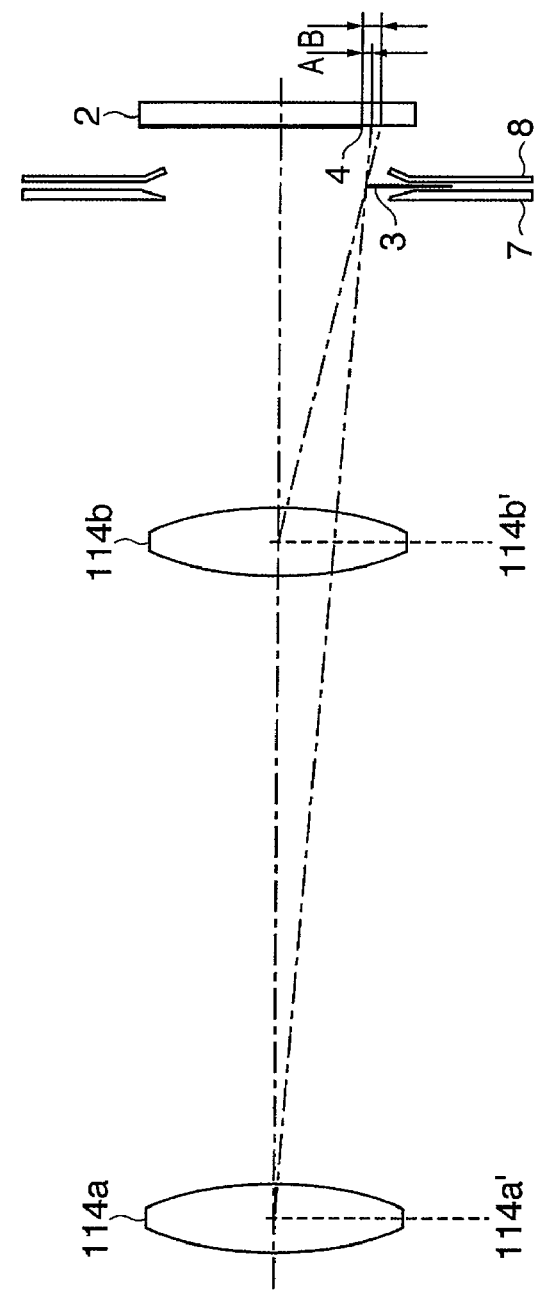
FIG. 3 is a diagram illustrating change in a charge accumulation area depending on the relative positions of an optical unit and a shutter according to the embodiment of the present invention.
Figure 4:
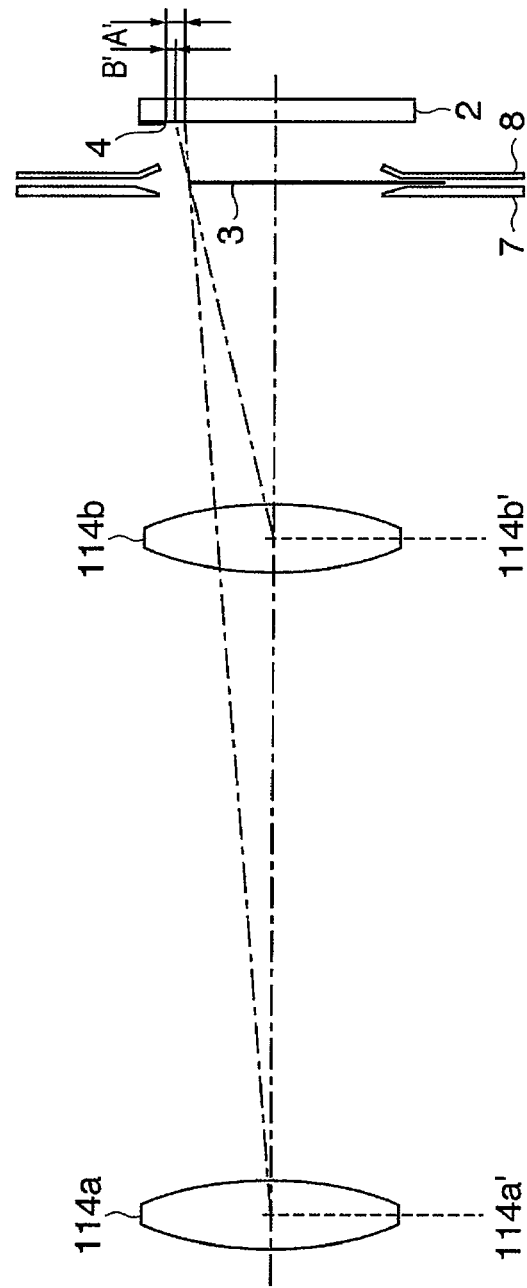
FIG. 4 is a diagram illustrating change in the charge accumulation area depending on the relative positions of the optical unit and the shutter according to the embodiment of the present invention.

FIGS. 3 and 4 are light path diagrams illustrating the relation among the photographing lens 114, the mechanical shutter 105, and the reset line of the image sensor 104. In FIGS. 3 and 4, a lens 114a denotes the photographing lens 114 with a longer focal distance and a longer exit pupil distance, whereas a lens 114b denotes the photographing lens 114 with a shorter focal distance and a shorter exit pupil distance. Further, reference numeral 7 designates a shutter base plate, and reference numeral 8 designates a shutter blade holding member. In addition, reference numerals 114a' and 114b' respectively designate positions of pupil (exit pupils) of the lenses 114a and 114b.

FIG. 3 shows a state just after the start of exposure of the image sensor 104 to light. A slit width A represents the width of an area, in the charge accumulation area 6 described with reference to FIG. 2, formed by the reset line 4 and a line on the image sensor 104 corresponding to the distal end 5 of the mechanical rear curtain 3 when shielding the image sensor 104 from light rays from the lens 114a with a longer focal distance and a longer exit pupil distance, whereas a slit width B represents the width of an area in the charge accumulation area 6 formed by the reset line 4 and a line on the image sensor 104 corresponding to the distal end 5 of the mechanical rear curtain 3 when shielding the image sensor 104 from light rays from the lens 114b with a shorter focal distance and a shorter exit pupil distance.

At the timing shown in FIG. 3, the slit width B is larger than the slit width A. More specifically, in a case in which the electronic front curtain and the mechanical rear curtain 3 are driven under the same conditions with respect to the photographing lenses 114a and 114b, the exposure light amount in the case of using the photographing lens 114b is larger than the exposure light amount in the case of using the photographing lens 114a. Thus, for example, in a case in which the timing for reset scan is controlled so as to form a slit width which provides appropriate exposure in the case of using the photographing lens 114a, when the photographing lens 114b is used for photography, overexposure will be caused at the timing soon after the start of exposure.

On the other hand, FIG. 4 shows the latter half of the photography (just before completion of the exposure). A slit width A' represents the width of an area formed by the reset line 4 and a line on the image sensor 104 corresponding to the distal end 5 of the mechanical rear curtain 3 when shielding the image sensor 104 from light rays from the lens 114a, whereas a slit width B' represents the width of an area formed by the reset line 4 and a line on the image sensor 104 corresponding to the distal end 5 of the mechanical rear curtain 3 when shielding the image sensor 104 from light rays from the lens 114b.

At the timing shown in FIG. 4, contrary to the state just after the start of the exposure as shown in FIG. 3, the slit width B' is smaller than the slit width A'. More specifically, in a case in which the electronic front curtain and the mechanical rear curtain 3 are driven under the same conditions with respect to the photographing lenses 114a and 114b, the exposure light amount in the case of using the photographing lens 114a is larger than the exposure light amount in the case of using the photographing lens 114b. Thus, if the slit width formed by the reset line 4 and the mechanical rear curtain 3 is the same as that just after the start of the exposure, overexposure will be caused just before completion of the exposure when the photographing lens 114a is used for photography.

As described, when the scan speed of the reset line and the travel speed of the mechanical rear curtain 3 are adjusted such that the slit width formed by the reset line 4 and the mechanical rear curtain 3 is always constant, unevenness of exposure (so-called unevenness of exposure in the vertical direction) will be caused between upper and lower portions of the image.

Figure 5A:
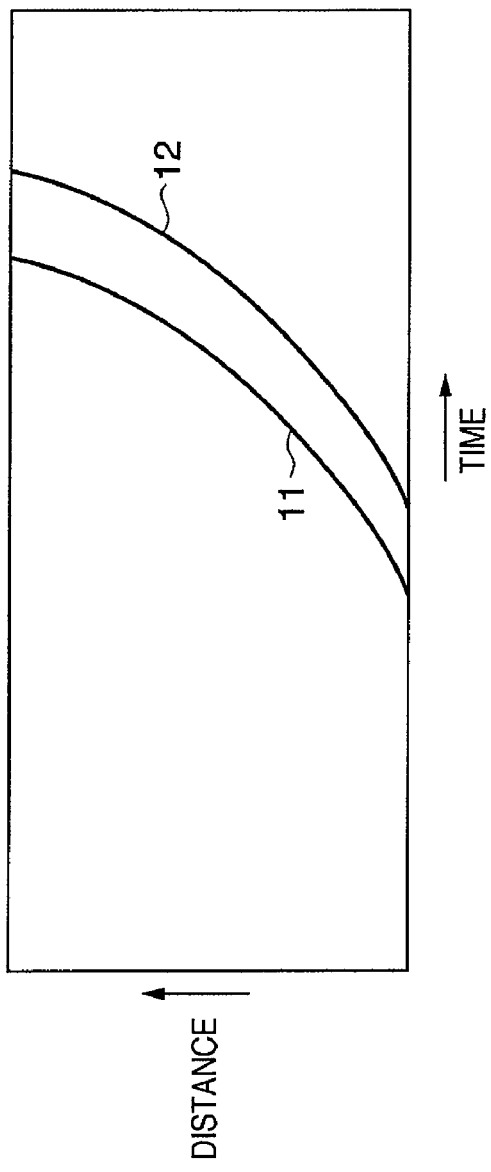
FIGS. 5A and 5B are conceptual diagrams showing the relation between movement and charge accumulation time of the shutter according to the embodiment of the present invention.
Figure 5B:
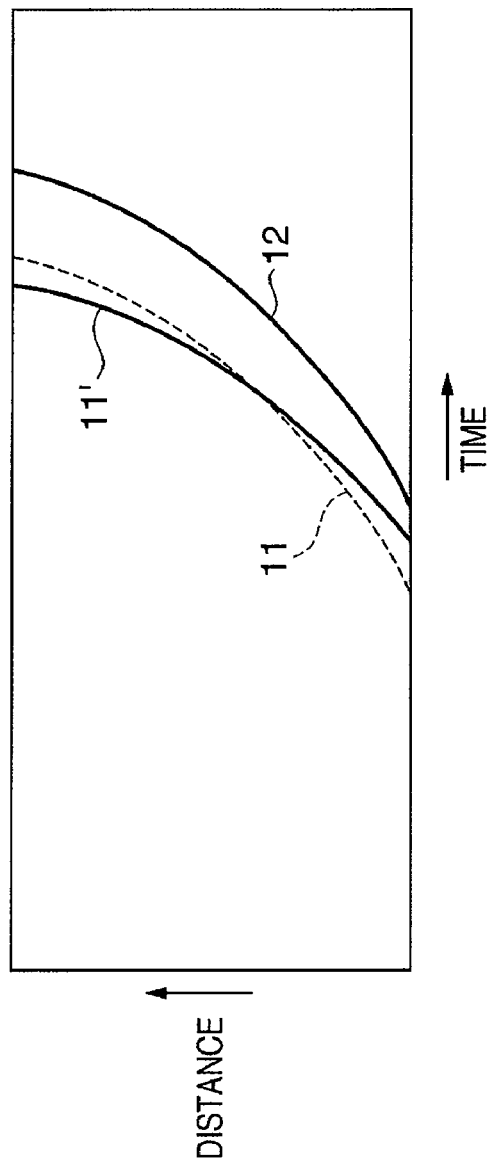

FIGS. 5A and 5B are diagrams illustrating the relation between a scan pattern for reset scan with the electronic front curtain and a travel pattern of the mechanical rear curtain in shutter control, where the horizontal axis indicates time and the vertical axis indicates a distance (position) from bottom up on the image sensor 104. In FIG. 5A, reference numeral 12 represents a travel curve of the mechanical rear curtain 3, which shows a speed increased gradually from the start of traveling. Reference numeral 11 represents a scan curve for the reset line 4 of the electronic front curtain. The distance between the scan curve 11 and the travel curve 12 in the direction of the time axis represents exposure time for each line of the image sensor 104. FIG. 5A has almost the same exposure time from bottom to top for the image sensor 104. When the focal length and exit pupil distance of the photographing lens 114 are sufficiently long (for example, 500 mm or more), appropriate exposure can be acquired by controlling scan for the reset line 4 with the use of a travel curve which has almost the same shape as that of the travel curve of the mechanical rear curtain 3.

However, as described previously, in a case in which both the focal length and exit pupil distance of the photographing lens are shorter, the angle of incidence of light beams that have passed through the lens and are entering the image sensor 104 is larger with respect to the optical axis, as compared with a case of using a photographing lens with a longer exit pupil distance. Therefore, in the control as shown in FIG. 5A, a lower portion of the image sensing plane of the image sensor 104 (corresponding to an upper half of the image) is overexposed, whereas an upper portion of the image sensing plane (corresponding to a lower half of the image) is underexposed. Therefore, the exposure time is made shorter for the lower portion of the image sensing plane and longer for the upper portion of the image sensing plane. In this way, the scan curve of the electronic front curtain is adjusted so that the time from subjecting the pixels of the image sensor 104 to reset scan to actually shielding the pixels by the mechanical rear curtain 3 from light entering the pixel through the photographing lens is equal for each pixel. For example, as shown in FIG. 5B, the scan curve 11 needs to be corrected to a scan curve denoted by reference numeral 11'.

Figure 6A:
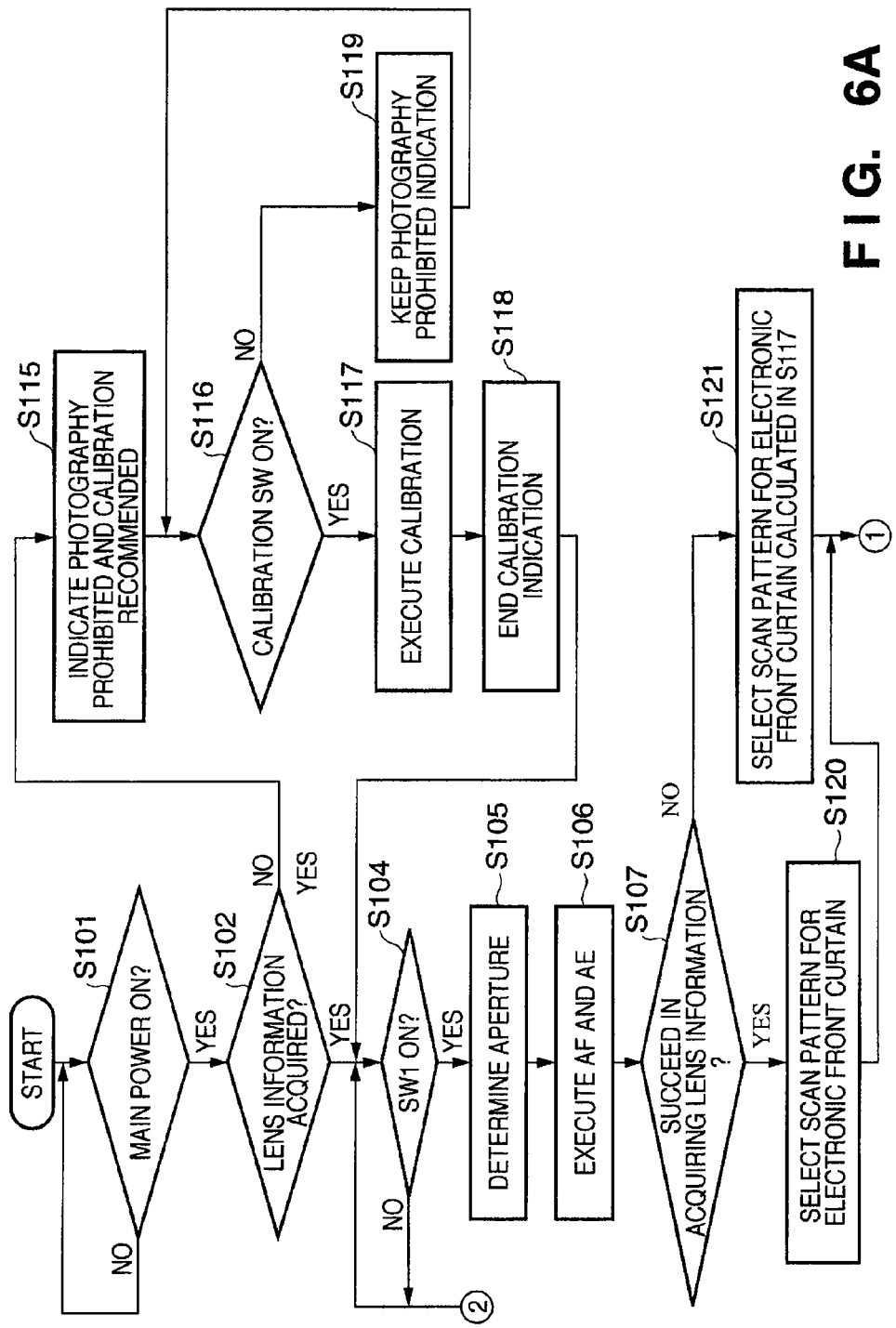
FIGS. 6A and 6B are flowcharts illustrating an image sensing process according to the embodiment of the present invention.
Figure 6B:
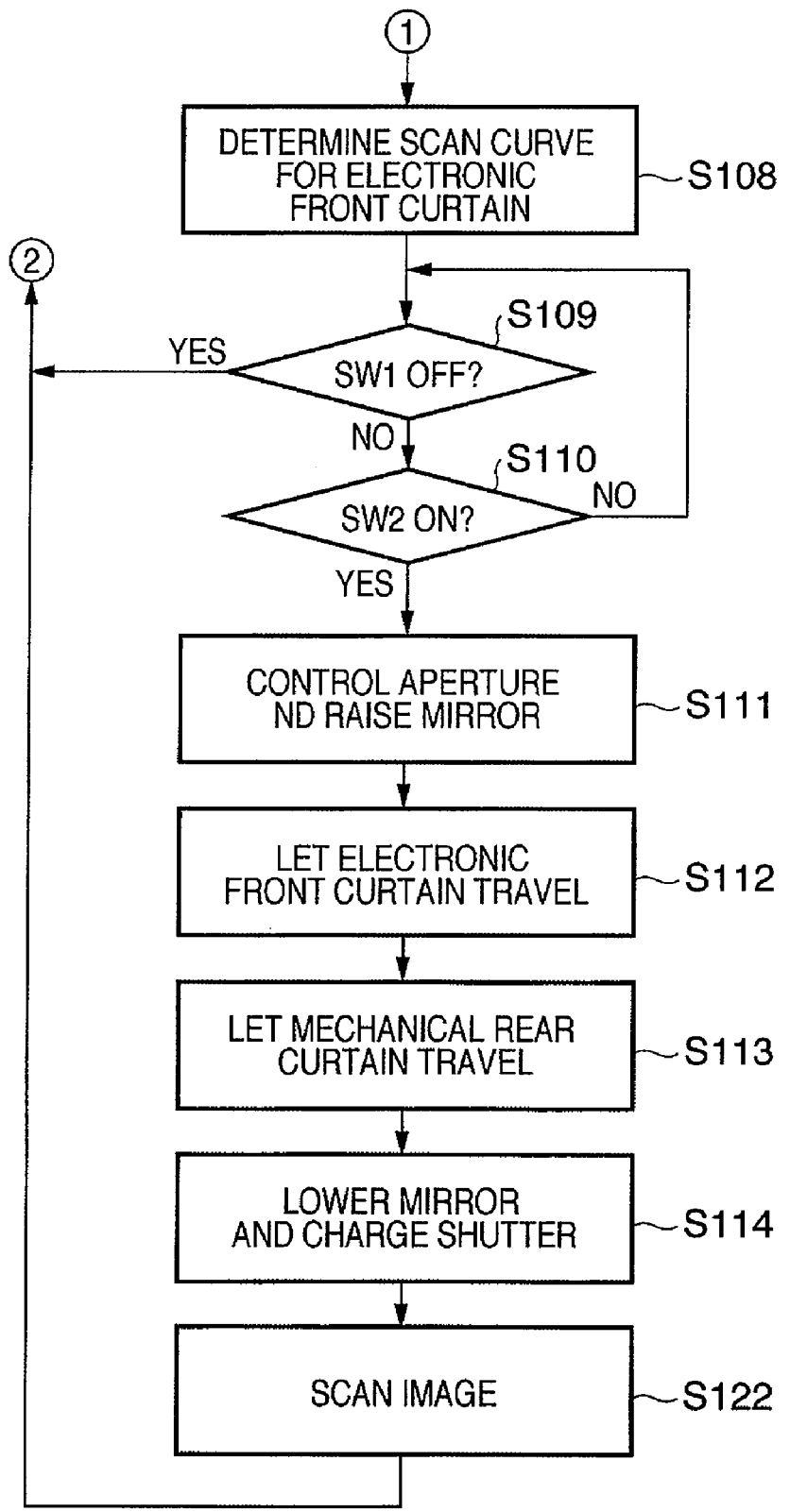

Control of above-described correction process recommendation display and photography prohibition display will now be described with reference to the flowchart shown in FIGS. 6A and 6B, in accordance with the steps of a photographic operation. It is to be noted that the process illustrated in FIGS. 6A and 6B is carried out mainly by the camera CPU 113.

When a main power supply SW in the switch unit 112 is turned ON, the process proceeds from step S101 to step S102. In step S102, the camera CPU 113 carries out control so as to obtain lens information such as the focal distance and exit pupil distance of the attached lens unit 101 via the contact points 120 and 121 from the lens CPU 115. In a case in which the attached lens unit 101 is able to communicate with the camera main body 100 and retains the lens information, the camera CPU 113 acquires the above-described lens information to proceed to step S104. It is to be noted that the lens CPU 115 of the lens unit 101 notifies the camera CPU 113, in response to a request from the camera CPU 113, of lens information such as the focal position and exit pupil distance of the lens and of zoom position information generated based on a zoom position.

On the other hand, in a case in which the lens information fails to be acquired in step S102, the process proceeds to step S115. Cases in which the lens information fails to be acquired include, for example, a case in which the attached lens unit is a shift lens without a lens shift amount of information and a case in which a manual lens is attached via a mount adapter. It is to be noted that in a case in which only insufficient information is acquired, the process also proceeds to step S115. In step S115, a display recommending correction (calibration) of a scan pattern for the electronic front curtain and a display of an intention to prohibit photography with the camera are made on the display device 151. In the next step S116, it is determined whether a switch SW (calibration SW) in the switch unit 112 for instructing correction of a scan pattern for the electronic front curtain is pressed or not. When the switch is pressed, calculation (calibration) of a scan pattern for the electronic front curtain is executed in step S117.

The calculation of the scan pattern for the electronic front curtain can be carried out by comparing the luminance difference in scanning with the electronic shutter and the mechanical shutter, for example, by using the technique described in Japanese Patent Laid-Open No. 11-41523. When the calibration of the scan pattern is completed, the display recommending correction of the scan pattern for the electronic front curtain and the display intending prohibition of photography with the camera are ended in step S118, and the process proceeds to step S104. Alternatively, when the calibration SW is not turned ON in step S116, the process returns to step S116 through step S119 and continues to maintain the photography prohibition display.

In step S104, the process stands by until the release button of the switch unit 112, a switch SW1, is turned on, and proceeds to step S105 when the switch SW1 is turned ON.

In step S105, the aperture of the lens is determined based on an output from a photometric sensor, not shown, and information such as an ISO sensitivity setting. Next, in step S106, focusing control (AF) and exposure control (AE) are carried out to set the focus position of the photographing lens 114, the aperture 118, and the ISO sensitivity. In the next step S107, the process proceeds to step S120 when the lens information has been acquired in step S102, or proceeds to step S121 when the lens information has failed to be acquired in step S102. In step S120, based on the focal distance, the exit pupil distance, the zoom position, the aperture value, the focus position, and the like from the acquired lens information, a scan pattern is selected from scan patterns for the electronic front curtain which are retained in the scan pattern retention unit 150. At this point, the camera CPU 113 changes the setting for reset scan by the vertical drive modulation circuit 108, for example, as indicated by the scan curve 11' in FIG. 5B. As described above, the scan curve 11' is suitable for a lens with a short focal distance and a short exit pupil distance. The scan curve 11' is acquired by delaying the timing for starting reset scan with the electronic front curtain as well as advancing the timing for ending the scan with respect to the scan curve 11 that shows movement approximately equal to the movement shown by the travel curve 12 of the mechanical rear curtain 3.

On the other hand, in a case in which it is determined in step S102 that the lens information has failed to be acquired (NO in step S107), the process proceeds to step S121 in which the scan pattern calculated in step S117 is selected as a scan pattern for the electronic front curtain.

Then, in step S108, the scan curve for the electronic front curtain selected in step S120 or S121 is determined as a scan pattern to be used.

In step S109, it is determined whether the switch SW1 is kept ON or not. The process proceeds to step S110 when the switch SW1 is kept ON and returns to step S104 when the switch SW1 is OFF. In step S110, it is determined whether a switch SW2 is turned ON or not, and the process returns to step S109 when the switch SW2 is ON, whereas proceeds to step S111 when it is detected that the switch SW2 is ON.

In step S111, the aperture 118 is adjusted to the aperture determined in step S105, and the mirror 102 is raised (withdrawn from the photographic optical path). Then, in step S112, driving of the electronic front curtain is started in accordance with the scan pattern determined in step S108. More specifically, the camera CPU 113 controls the vertical drive modulation circuit 108 in order to execute reset scan in accordance with the scan pattern determined from among the scan patterns retained in the scan pattern retention unit 150 or the scan pattern calculated by calibration. Then, in step S113, the mechanical rear curtain 3 is driven and controlled to sequentially shield the image sensor 104 from light.

For example, in a case in which the photographing lens 114 of the lens unit 101 is a lens with a short focal length and a short exit pupil distance, the scan curve 11' in FIG. 5B is selected, and driving of the electronic front curtain (reset scan) is executed in accordance with this scan pattern. Further, the mechanical rear curtain 3 is subjected to traveling in accordance with the travel curve 12. In this way, charge accumulation is sequentially carried out on the image sensor 104 to complete the photography.

Finally, in step S114, the mirror 102 is lowered and the mechanical shutter 105 is subjected to shutter charge, and in step S122, electrical charge signals are read out from the image sensor 104 and processed to obtain an image. The process described above completes a series of image sensing sequences, and returns to step S104.

As described above, according to the present embodiment, in a case in which an electronic front curtain and a mechanical rear curtain are used to carry out photography, it is possible to avoid photography with uneven exposure by warning or to change the scan pattern for the electronic front curtain depending on the attached lens, thereby enabling an image with unevenness of exposure reduced between pixels to be photographed.

Further, in the present embodiment, the indication for urging correction of a scan pattern for the electronic front curtain and the indication for prohibiting photography with the camera are used in combination when the lens information fails to be acquired in step S102 in FIG. 6A. However, the present invention is not limited to this combination, and alternatively only one of the operations of either correcting a scan curve for the electronic front curtain or prohibiting photography with the camera may be carried out. In addition, besides the operations described above, as an operation of the image sensing apparatus in the case in which the lens information fails to be acquired, the settings may be configured in such a way that photography is allowed after informing a user, on a menu screen or the like, that unevenness of exposure may result if photography is still continued.

Further, although the process described above is controlled so as to prohibit photography when the calibration SW is not turned ON in step S116, the present invention is not limited to this control. Thus, for example, when the calibration SW is not turned ON for more than a predetermined period of time, the scan pattern 11 in FIG. 5A may be selected as a scan pattern for the electronic front curtain so as to display, on the display device 151, a warning that unevenness of exposure will likely result between upper and lower portions of an image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-138197, filed May 24, 2007 which is hereby incorporated by reference herein in its entirety.

What is claimed is:

1. An image sensing apparatus in which a plurality of lens units can be exchanged and attached, the image sensing apparatus comprising:

an acquisition unit configured to acquire, from an attached lens unit, lens information including at least an exit pupil distance of the lens unit;

an image sensor comprising a plurality of pixels for converting incident light into electrical charges corresponding to an amount of incident light;

a shutter unit configured to shield the image sensor from light;

a reset unit configured to sequentially reset the pixels of the image sensor in a traveling direction of the shutter unit, prior to starting to shield the image sensor from light using the shutter unit;

a calculation unit configured to calculate timing for resetting the pixels such that a time period from resetting using the reset unit to shielding the image sensor from light entering through the lens unit by traveling of the shutter unit is equal for each pixel of the image sensor in a case in which the lens information fails to be acquired using the acquisition unit;

an operation unit configured to receive an instruction to calculate the timing using the calculation unit; and a control unit configured to control timing for resetting the pixels using the reset unit, wherein photography is prohibited in a case in which the lens information fails to be acquired using the acquisition unit, and the prohibition is cancelled in response to completion of the calculation of the timing by the calculation unit performed in response to the reception of the instruction by the operation unit, and the control unit controls timing for resetting the pixels using the reset unit based on the timing calculated by the calculation unit.

2. The image sensing apparatus according to claim 1, wherein, in a case in which the lens information is acquired using the acquisition unit, the control unit controls timing for resetting the pixels using the reset unit such that a time period from resetting the pixels using the reset unit to shielding the image sensor from light entering through the lens unit by traveling of the shutter unit is equal for each pixel, based on the lens information acquired using the acquisition unit.

3. The image sensing apparatus according to claim 1, further comprising a pattern retention unit configured to retain a plurality of patterns that indicate timing for resetting the pixels,
wherein, in a case in which the lens information is acquired using the acquisition unit, the control unit selects one pattern from the plurality of patterns retained in the pattern retention unit based on the lens information.

4. The image sensing apparatus according to claim 1, wherein the control unit makes an exposure period for an upper half of an image sensing plane longer than exposure time for a lower half of the image sensing plane in a case in which the lens information is acquired, a focal distance is shorter than a first predetermined value, and an exit pupil distance is shorter than a second predetermined value.

5. A control method for an image sensing apparatus in which a plurality of lens units can be exchanged and attached, the image sensing apparatus comprising an image sensor comprising a plurality of pixels for converting incident light into electrical charges corresponding to an amount of incident light and a shutter unit configured to shield the image sensor from light, the control method comprising:
an acquiring step of acquiring, from an attached lens unit, lens information including at least an exit pupil distance of the lens unit;
a reset step of sequentially resetting the pixels of the image sensor in a traveling direction of the shutter unit;
a shutter traveling step of causing the shutter unit to travel to sequentially shield the pixels from light;
a prohibiting step of prohibiting photography in a case in which the lens information fails to be acquired in the acquiring step;
a calculation step of, performed in response to reception of an instruction by an operation unit during the photography being prohibited, calculating timing for resetting the pixels such that a time period from resetting the pixels in the reset step to shielding the pixels from light entering through the lens unit by traveling of the shutter unit is equal for each pixel, in a case in which the lens information fails to be acquired in the acquiring step; and
a canceling step of canceling the prohibition of photography in response to completion of the calculation of the timing by the calculation unit,
wherein in the reset step the reset is carried out based on the timing calculated in the calculation step after the prohibition of photography is cancelled.

* * * * *